US005431310A

United States Patent [19]
Kanner et al.

[11] Patent Number: 5,431,310
[45] Date of Patent: Jul. 11, 1995

[54] LIQUID DISPENSER NOZZLE ASSEMBLY

[75] Inventors: Rowland W. Kanner, Guntersville, Ala.; Geoffrey M. Nevelli, Glen Ellyn, Ill.

[73] Assignee: Ryder International Corporation, Arab, Ala.

[21] Appl. No.: 245,043

[22] Filed: May 17, 1994

Related U.S. Application Data

[60] Continuation-in-part of Ser. No. 71,510, Jun. 2, 1993, Pat. No. 5,320,254, which is a division of Ser. No. 972,411, Nov. 5, 1992, Pat. No. 5,255,826, which is a division of Ser. No. 664,347, May 4, 1991, Pat. No. 5,183,184, which is a continuation-in-part of Ser. No. 406,053, Sep. 11, 1989, Pat. No. 5,025,957, which is a continuation-in-part of Ser. No. 255,365, Oct. 7, 1988, abandoned.

[51] Int. Cl.$^6$ .......................... B67D 5/58; B65D 37/00
[52] U.S. Cl. ........................................... 222/212; 222/494
[58] Field of Search ............... 222/212, 213, 189, 490, 222/494, 491, 492, 420, 421

[56] References Cited

U.S. PATENT DOCUMENTS

| | | | |
|---|---|---|---|
| 4,420,101 | 12/1983 | O'Neill | 222/212 |
| 4,646,945 | 3/1987 | Steiner et al. | 222/212 X |
| 4,776,495 | 10/1988 | Vignot | 222/494 X |
| 5,025,957 | 6/1991 | Ranalletta et al. | 222/494 X |
| 5,197,638 | 3/1993 | Wood | 222/212 |
| 5,219,101 | 6/1993 | Matkovich et al. | 222/212 X |

OTHER PUBLICATIONS

Technical Bulletin on GORE-TEX® Microfiltration Products, 1990.

*Primary Examiner*—Kevin P. Shaver
*Attorney, Agent, or Firm*—Trexler, Bushnell, Giangiorgi & Blackstone, Ltd.

[57] ABSTRACT

A liquid dispensing nozzle assembly is provided for mounting on a liquid container and dispenser having a flexible wall and liquid storage cavity for manually squeezed dispensing of liquid from the cavity through the nozzle assembly. The nozzle assembly maintains the liquid, such as contact lens cleaning and conditioning solutions in sterile condition during storage and repeated dispensing of the liquid from the container cavity. The nozzle assembly includes a liquid conduit for communication form the container cavity to a liquid discharge port from the nozzle assembly to enable dispensing of the liquid displaced by manually squeezing the flexible wall of the container. The nozzle assembly also includes a sealing element for sealing the liquid conduit against liquid leakage in which the sealing element has a composition comprising polytetrafluoroethylene which can provide sealing engagement directly against a molded plastic surface of either a molded component of the nozzle assembly or the container-dispenser. The sealing element can be provided by a peripheral portion of a polytetrafluoroethylene flow control diaphragm to provide an integral, sealing ring thereon.

15 Claims, 4 Drawing Sheets

LIQUID DISPENSER NOZZLE ASSEMBLY

CROSS REFERENCE TO RELATED APPLICATIONS

This application is a continuation-in-part of application Ser. No. 071,510 filed Jun. 2, 1993, now U.S. Pat. No. 5,320,254 which is a divisional of Ser. No. 972,411 filed Nov. 5, 1992, now U.S. Pat. No. 5,255,826, which is a divisional of application Ser. No. 664,347 filed May 4, 1991, now U.S. Pat. No. 5,183,184, which is a continuation-in-part of application Ser. No. 406,053 filed Sep. 11, 1989, now U.S. Pat. No. 5,025,957, which is a continuation-in-part of application Ser. No. 255,365 filed Oct. 7, 1988, now abandoned.

BACKGROUND OF THE INVENTION

The present invention relates to liquid storage containers for manually dispensing liquids such as cleaning solutions for contact lenses, and more particularly relates to dispensing nozzles on containers for liquid which must be stored in sterile condition.

Liquids, for example, solutions for cleaning and conditioning contact lenses, have typically been stored in manually squeezable bottles from which the user can repeatedly dispense the stored liquid. These liquids must be uncontaminated by microorganisms such as bacteria. Accordingly, expensive bactericidal agents have sometimes been included in liquid formulation, as for example, in saline formulations for cleaning contact lenses. Furthermore, the squeezable dispensing bottles have sometimes been provided with nozzles including diaphragm structures which control the dispensing flow as well as sealing the liquid cavity during storage, as described in the afore-mentioned U.S. Pat. Nos. 5,255,826, 5,183,184 and 5,025,957. These patents describe nozzle structures which can be employed on dispensing containers to provide for either air aspirated liquid dispensing capability or non-aspirated liquid dispensing.

The dispensing nozzle structures in accordance with the present invention provide nozzle improvements particularly in sealing configuration and materials.

SUMMARY OF THE INVENTION

In accordance with the present invention, a liquid dispensing nozzle assembly is provided for mounting on a liquid container and dispenser having a flexible wall and liquid storage cavity for manually squeezed dispensing of liquid from the cavity through the nozzle assembly. The nozzle assembly maintains the liquid, such as contact lens cleaning and conditioning solutions in sterile condition during storage and repeated dispensing of the liquid from the container cavity. The nozzle assembly includes a liquid conduit for communication from the container cavity to a liquid discharge port from the nozzle assembly to enable dispensing of the liquid displaced by manually squeezing the flexible wall of the container. The nozzle assembly also includes a sealing element for sealing the liquid conduit against liquid leakage in which the sealing element has a composition comprising polytetrafluoroethylene which can provide sealing engagement directly against a molded plastic surface of either a molded component of the nozzle assembly or the mouth of container-dispenser.

In one embodiment, the sealing element is provided by a peripheral portion of a polytetrafluoroethylene flow control diaphragm to provide an integral, sealing ring thereon.

DETAILED DESCRIPTION OF THE PREFERRED EMBODIMENT

Figure 1:
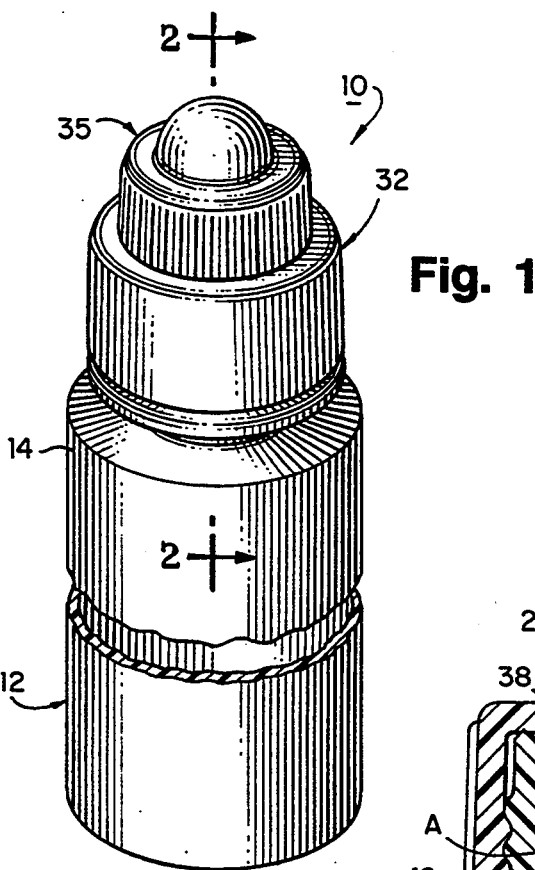
FIG. 1 is a perspective view of one embodiment of the liquid nozzle assembly in accordance with the invention, mounted on a liquid storage and dispensing container.
Figure 2:
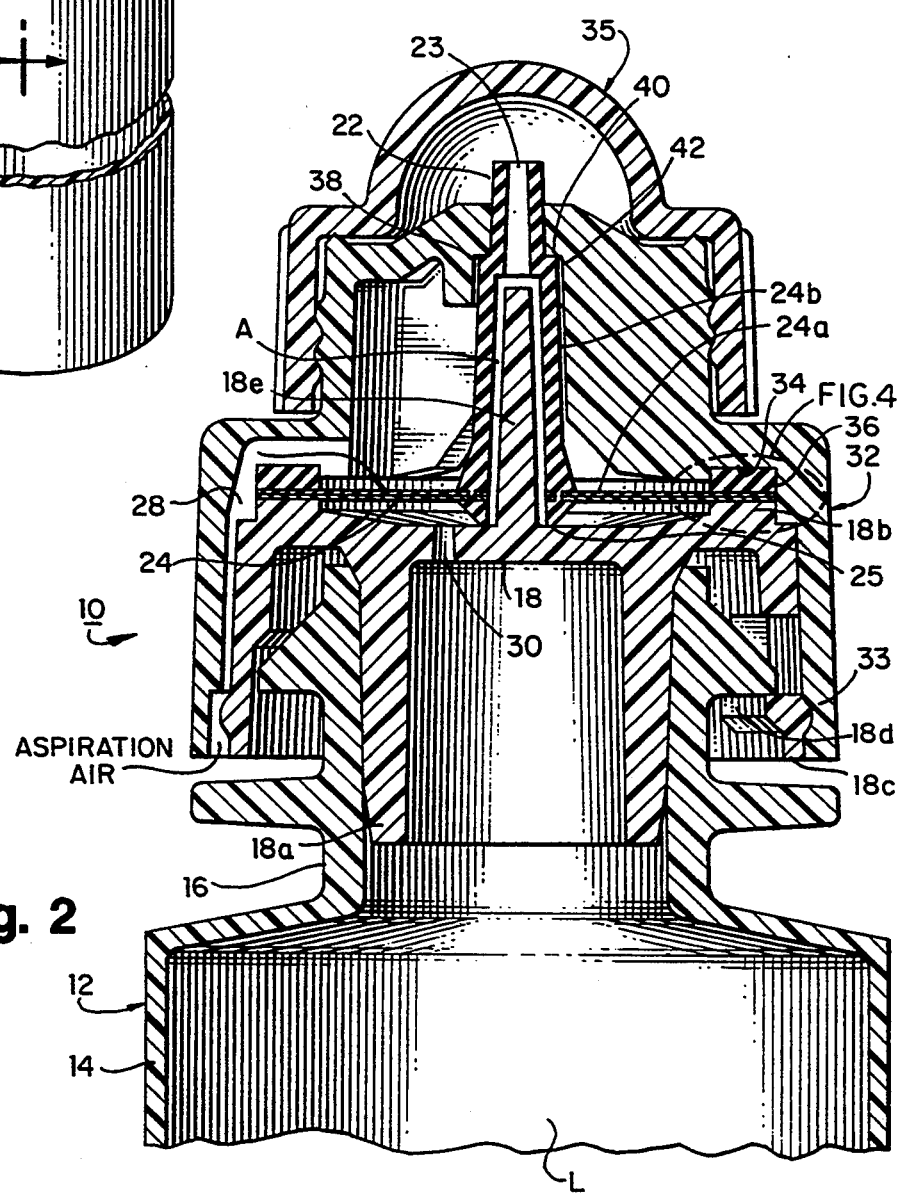
FIG. 2 is a sectional view along a plane indicated by line 2—2 in FIG. 1.

Referring to FIGS. 1 and 2, an embodiment of the nozzle assembly in accordance with the invention and designated generally by reference character 10 is shown mounted on a molded plastic bottle container 12 for sterile liquid L with a squeezable wall 14. The container 12 opens at the top from a neck portion 16. An adapter portion 18 of the nozzle assembly generally closes the mouth of the neck 16 and has a cylindrical wall 18a which projects downwardly into the opening of the neck and securely seals against the interior surface of the neck. The raised upper annular surface 18b of the adapter 18 supports a diaphragm structure 24 which integrally includes both a diaphragm portion 24a and a valve element portion 24b as more fully described hereinafter. The annular diaphragm portion 24a is peripherally clamped and sealed against a raised annular portion 18b of the upper surface of the adapter 18 as more fully described hereinafter. In the illustrated embodiment, the adapter 18 has a downwardly extending cylindrical skirt portion 18c with radially inwardly projecting feet or lugs 18d which are forced under coupling flange 16a on the neck 16 to enable an interference fit coupling of the nozzle assembly 10 on the bottleneck 16.

Figure 3:
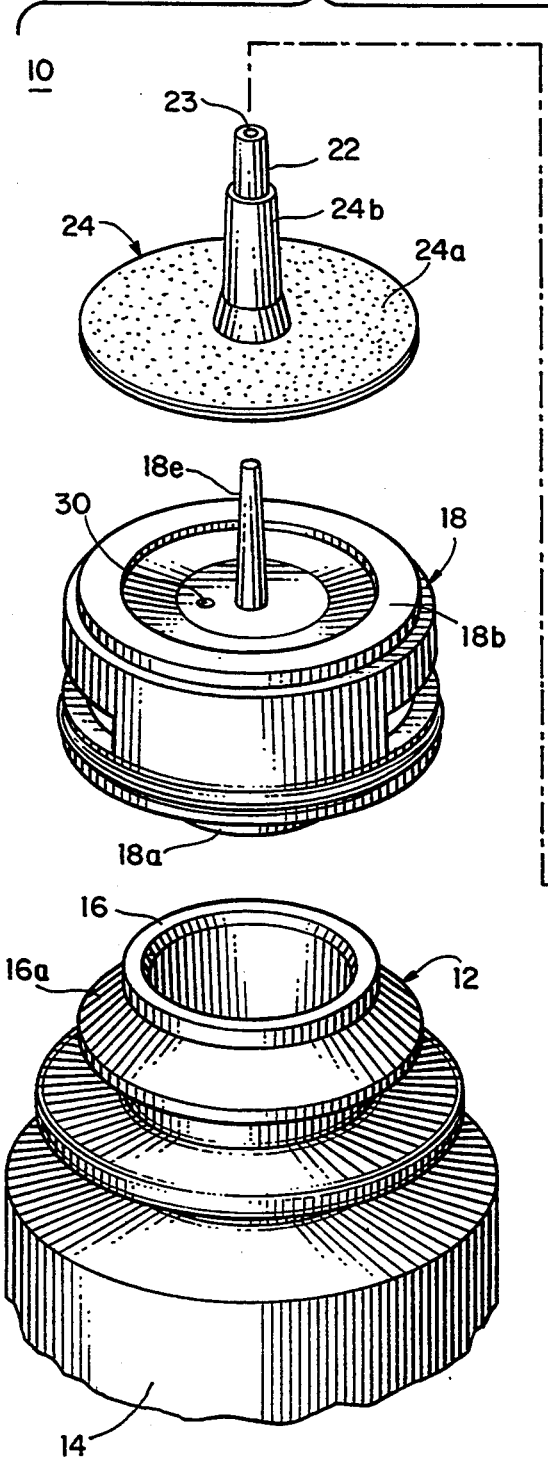
FIG. 3 is an exploded, perspective view of the nozzle assembly in FIGS. 1 and 2.
Figure 3:
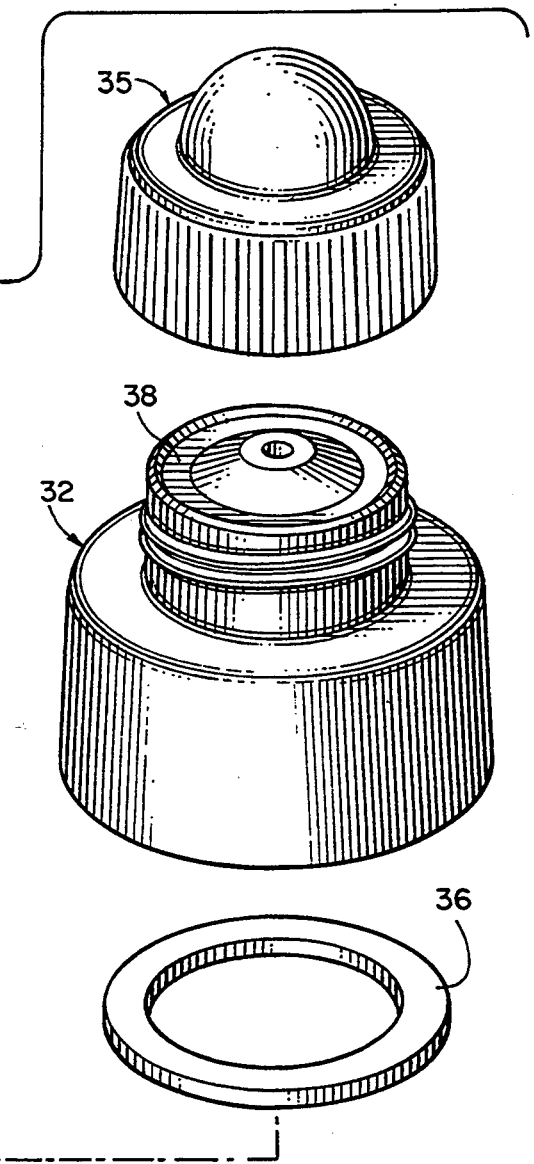
Figure 4:
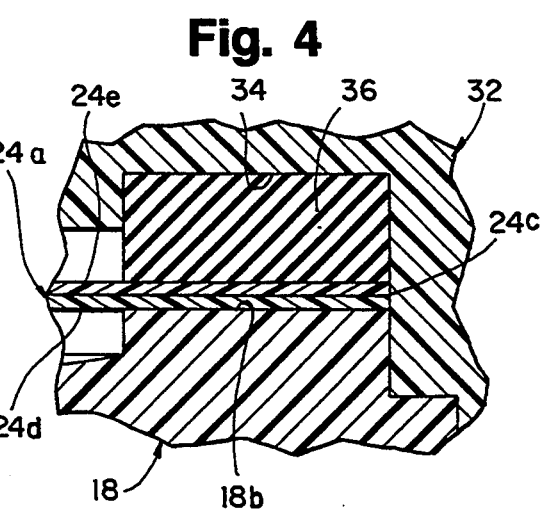
FIG. 4 is an enlarged, fragmentary sectional view of the sealing portion of the nozzle assembly as indicated in FIG. 2.
Figure 5:
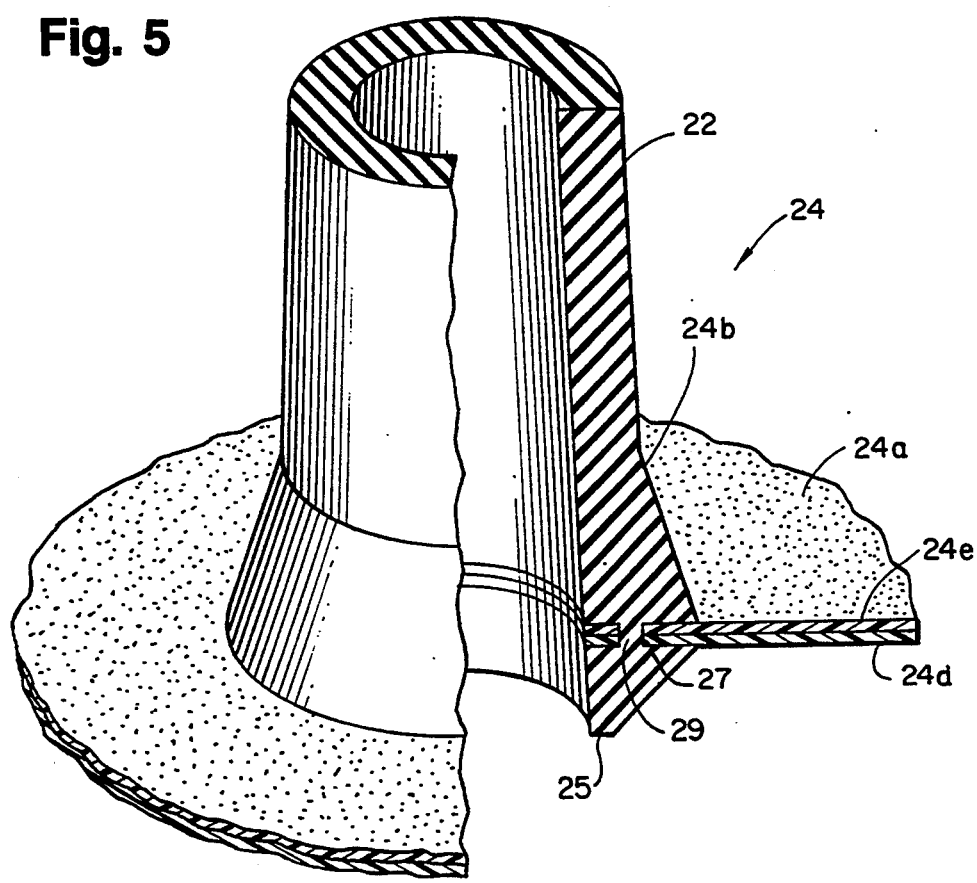
FIG. 5 is an enlarged, fragmentary partially sectional view of the integral diaphragm structure as shown in FIGS. 2 and 3.
Figure 6:
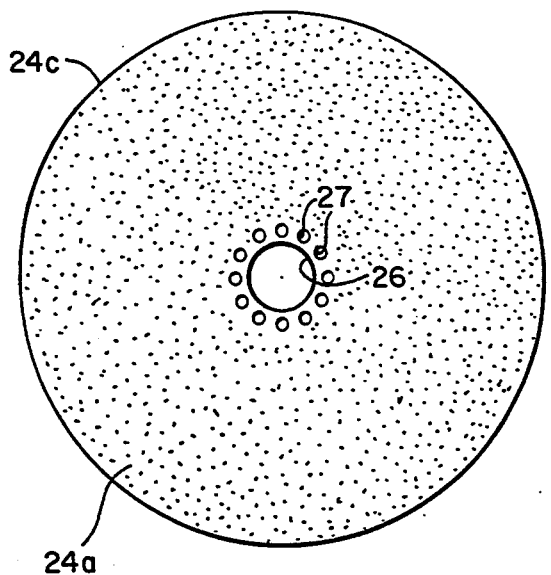
FIG. 6 is a plan view of a portion of the diaphragm structure in FIG. 5.

Referring to FIGS. 3, 5 and 6, in the illustrated embodiment, the annular diaphragm portion 24a of the integrated diaphragm structure 24 has a particularly beneficial composition comprising polytetrafluoroethylene (PTFE) which I have discovered will provide extraordinary mechanical purchase or grip as well as a liquid-tight seal under clamped engagement against high gloss or polished surface of the molded plastic annular upper surface portion 18b of the adapter 18 as particularly shown in FIGS. 2 and 4; as a result, the peripheral edge portion 24c of the diaphragm portion 24a grips the annular surface of adapter portion 18b and withstands the lateral tension forces imposed therein during resilient deflection of the diaphragm portion 24a during dispensing of the liquid as more fully described hereinafter. The peripheral edge portion 24c of the diaphragm portion 24a also provides an integral sealing ring while allowing the necessary resilient deflection. In the illustrated embodiment, a housing cap 32 has an internal, annular seat 34 fitting a clamping ring 36 which is clamped against the diaphragm support layer 24e to secure the sealed engagement of the expanded PTFE layer 24d against the adapter surface 18b as best shown in FIG. 4. The clamp by the cap 32 is provided by the snap lug arrangement 33 thereof cooperating with the adapter skirt 18c. A threaded cover 35 removably fits over the tubular nozzle 22 and cap boss 38.

As in the illustrated embodiment, the diaphragm portion 24a has expanded PTFE layer 24d laminated to a support layer 24e of suitable material including polypropylene, polyethylene, polyester, nylon or rayon. A particularly suitable laminate material serving as the diaphragm portion 24a is commercially available from W. L. Gore and Associates, Inc. of Elkton, Md. under the tradename GORE-TEX®RST as polytetrafluoroethylene materials including an expanded, hydrophobic PTFE membrane laminated on one side with a non-woven polyester support layer enabling improved handling. Both the expanded PTFE layer 24d and support layer 24e of the laminate can be air permeable to enable air aspiration therethrough when beneficial to aspirate a container.

In the particularly preferred embodiment illustrated, the diaphragm portion 24a is inserted during molding of the valve element portion 24b for example from elastomeric material, such as silicone rubber. As shown in FIGS. 5 and 6, the diaphragm portion 24a has a central aperture 26 which is surrounded by an annular series of smaller punched or otherwise fabricated holes 27 which provide passageway for liquid elastomer during the molding operation to form the valve element portion 24b so that the resulting integral coupling links 29 as best shown in FIG. 5, project through the holes 27 to form molded mechanical interlock of the valve portion 24b and the diaphragm portion 24a. Integrally molded with the valve portion 24b is a tubular, liquid discharge nozzle portion having a dispensing discharge orifice 23. The support layer 24e of the diaphragm portion 24a is preferably a composition such as polyester which will withstand the elevated molding heat required for insertion during molding of the valve member portion 24b.

Referring again to FIG. 2, the cap 32 also has an annular boss portion 38 which has an internal annular surface 40 which seats against and compresses the annular upper surface 42 of the columnar diaphragm valve portion 24b so that the clamping by the cap 32 also compresses the diaphragm valve portion 24b to force the normal sealing engagement of the bottom, tapered sealing ring surface 25 against the upper wall surface of the adapter 18 which serves as the valve seat.

The normal seal by the sealing ring 25 under compression by the cap boss portion 38 prevents leakage of the stored liquid L within the container even under hydrostatic pressure when the container is inverted during handling, and to prevent any backflow of non-sterile air or liquid from the clearance space A into the bottleneck 16. The backflow of liquid is additionally prevented by the projection of the conically shaped nipple portion 18e which projects upwardly from the upper wall of the adapter 18. The clearance space A leads to the central bore of the tubular portion 22 and discharge orifice 23, and the nipple portion 18e minimizes the volume of liquid remaining in the clearance space A when the dispensing flow is stopped. The small amount of liquid remaining in the clearance space A, which can be exposed to contamination by air, will be flushed out before the next dispensing.

Figure 7:
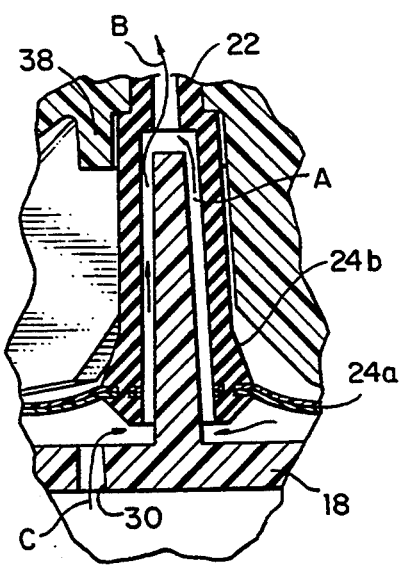
FIG. 7 is an enlarged, fragmentary sectional view of the deflection of a valve element shown in FIG. 2 which opens the liquid dispensing conduit in the nozzle assembly.

Referring to FIG. 7, when the flexible container wall 14 is squeezed to dispense the liquid L from the inverted container 12 and nozzle assembly 10, the liquid flows through the passageway bore 30 as indicated at arrow C, and exerts the necessary threshold hydraulic pressure against the liquid-impermeable hydrophobic PTFE portion 24a of the diaphragm structure 24 which is resiliently deflected to further compress the tubular valve portion 24b against the boss; the additional compression of the valve portion 24b thereby displaces and unseats the annular sealing ring 25, on the surface of the adapter 18 to enable the liquid flow therebetween into the adjacent portion of the annular clearance space A (which is enlarged by the diaphragm deflection). Optionally, the cap 32 has a narrow vent groove 28 as shown in the left half of FIG. 2 which is located on the dry or non-liquid side above the diaphragm 24a to enable air aspiration of the container 12.

The liquid flow through the clearance space A leads to discharge of the liquid through the tubular nozzle 22 as indicated by the arrow B. The elastomeric valve portion 24b and sealing ring 25 perform as a one-way valve allowing only outflow of dispensed liquid when the flexible container wall 14 is squeezed. Once the additional compression of the valve portion 24b is relaxed when the manual squeeze is released, the residual compression of the valve portion 24b will cause the sealing ring 25 to reseat and firmly seal against the wall of the adapter 18 to close the one-way valve and prevent any backflow of liquid or air. Such backflow might otherwise occur, for example, should the dispenser become exposed to non-sterile fluids such as by dropping into contaminated liquid. The valve portion column 24b thus acts as an integral and elastomeric biasing spring on the sealing ring 25.

In aspirated embodiments for reinflation of the squeezed flexible container wall 14 and to replace the liquid dispensed, ambient air is drawn into the entrance passageway 28 and is downwardly directed and filtered through the diaphragm portion 24a above the passageway bore 30 through which the air flows through the adapter skirt 18 and container neck 16. The filtering portion 24a of the diaphragm 24 thus serves dual function as both the aspiration air filter as well as the hydraulically deflectable portion of the diaphragm valving in the liquid dispensing conduit. Accordingly, the integration of the hydraulically deflectable air filter within the diaphragm structure enables particularly uncomplicated flow path of the air aspiration conduit and a simplified nozzle assembly without jeopardizing contamination of the sterile liquid during storage and successive dispensing. The expanded PTFE diaphragm portion 24a preferably has a pore size of approximately 0.45 micron which is impenetrable by bacteria so that the aspirating air is filtered to prevent entrained bacteria from contaminating the sterile liquid during aspiration of the container 12.

Figure 8:
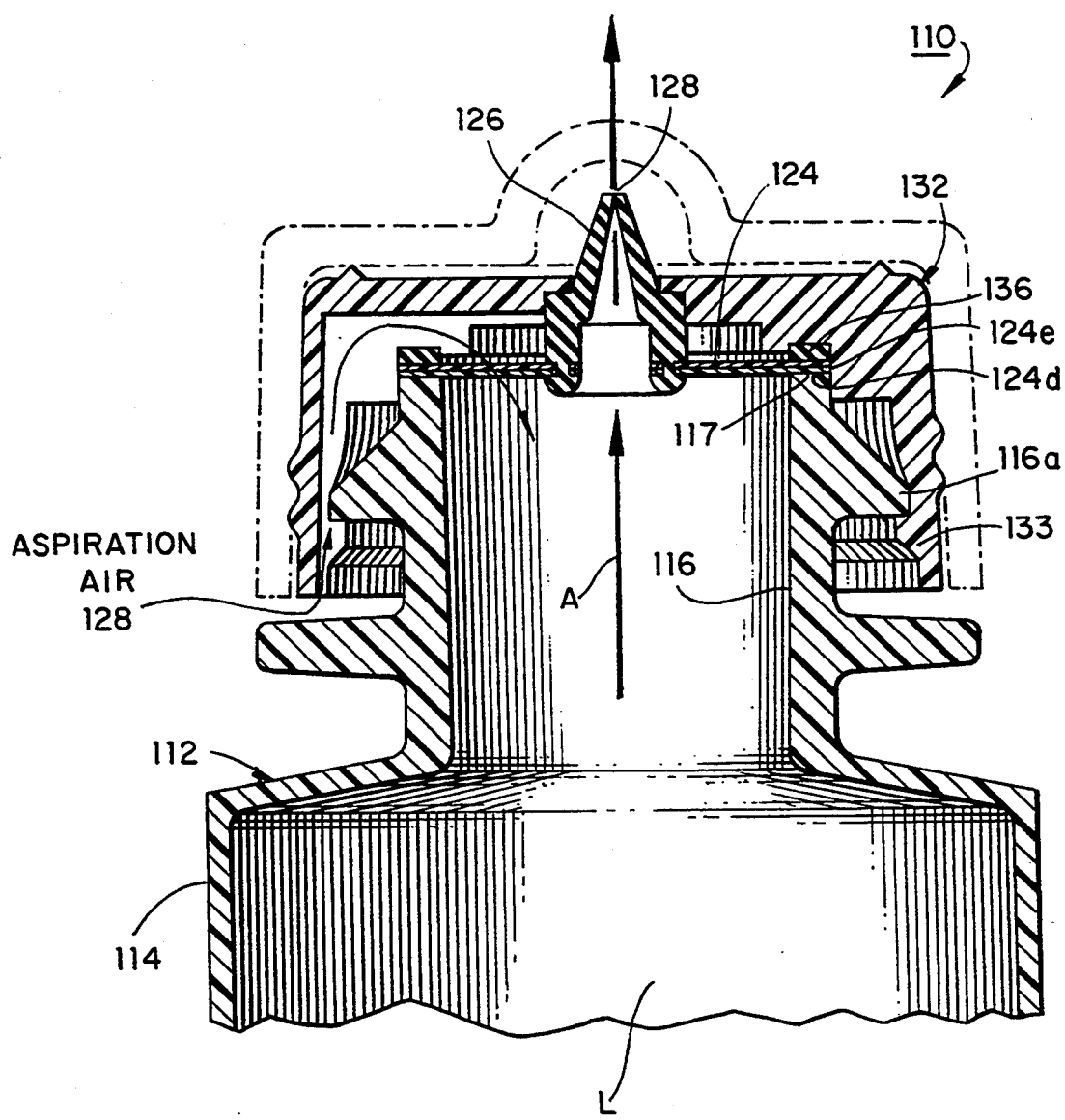
FIG. 8 is a sectional view through a second embodiment of a liquid nozzle assembly in accordance with the invention.

Referring now to FIG. 8, a second embodiment of a nozzle assembly in accordance with the present invention is designated generally by reference character 110 and is mounted on a molded plastic bottle container 112 with a squeezable wall 114 and neck portion 116. In this embodiment, the expanded PTFE diaphragm layer 124d is clamped to grip and seal directly against the annular end wall surface 117 of the container neck 116. The cap 132 and coupling skirt 133 thereof are directly clamped to the coupling flange 116a. A clamping ring 136 fitted into the cap 132 is clamped against the optional diaphragm support layer 124e laminated to the PTFE layer 124d.

The diaphragm portion 124 is integrated with a one-way liquid dispensing valve 126, preferably by insert molding thereof from elastomeric composition for example silicone rubber. In the illustrated embodiment, the one-way valve portion 126 terminates in a "duckbill" discharge structure 128 which opens with hydraulic discharge pressure of the dispensed liquid flow indicated by arrows A when the container wall 114 is squeezed. Alternative one-way valve structures may also be employed for example one-way flow "flapper" valves or other suitable valves which close to prevent flow when liquid dispensing from a container 12 is discontinued. In this illustrated embodiment, the nozzle assembly 110 provides air aspiration of the container 112 through an ambient air entrance passageway 128 in the cap 132. The PTFE diaphragm layer 124d filters the aspirating air as in the first embodiment of the nozzle assembly 10.

While a preferred embodiment of the present invention is shown and described, it is envisioned that those skilled in the art may devise various modifications of the present invention without departing from the spirit and scope of the appended claims.

The Invention Claimed Is:

1. A liquid dispensing nozzle assembly for mounting on a liquid container and disperser having a flexible wall and liquid storage cavity for manually squeezed dispensing of liquid from the cavity through the nozzle assembly and for maintaining the liquid, such as contact lens saline solution, in sterile condition during storage and repeated dispensing of the liquid from the container cavity, said nozzle assembly comprising:
   a discharge port;
   liquid conduit means for flow communication from the container cavity to said discharge port to enable dispensing of said liquid therethrough during said squeezed liquid dispensing;
   a base member supporting said nozzle assembly and securable to a liquid delivery portion of said container; and
   a seal element in sealing engagement against said base member for sealing said liquid conduit means against liquid leakage therefrom, wherein said seal element has a composition comprising polytetrafluoroethylene, wherein said seal element comprises a laminate incorporating a first layer of said polytetrafluoroethylene and a second, support layer therefor.

2. A nozzle assembly according to claim 1, wherein said seal element forms a portion of a diaphragm structure arranged to control liquid flow through said liquid conduit means.

3. A nozzle assembly according to claim 2, wherein said seal element comprises a peripheral portion of said diaphragm structure surrounding a valve portion of said diaphragm structure which is deflectable to permit said liquid flow through said liquid conduit means.

4. A nozzle assembly according to claim 3, wherein said seal element comprises an annular portion peripherally joined to said valve portion.

5. A nozzle assembly according to claim 2, wherein said seal element and said valve portion are integrally joined in said diaphragm structure.

6. A nozzle assembly according to claim 5, wherein said seal element is integrated by insertion during molding of said valve portion.

7. A nozzle assembly according to claim 1, wherein said seal element is clamped between said base member and a nozzle housing comprised within said nozzle assembly.

8. A nozzle assembly according to claim 7, further comprising a clamping member clamped between said seal element and said nozzle housing.

9. A nozzle assembly according to claim 1, wherein said second support layer has a composition comprising heat resistant material.

10. A nozzle assembly according to claim 1, wherein said second, support layer has a composition comprising polyester.

11. A nozzle assembly according to claim 1, wherein said base member includes at least one through passageway forming a portion of said liquid conduit means.

12. A nozzle assembly according to claim 1, wherein said seal element is arranged on said nozzle assembly to enable sealing engagement against the liquid container.

13. A liquid dispensing nozzle assembly for mounting on a liquid container and disperser having a flexible wall and liquid storage cavity for manually squeezed dispensing of liquid from the cavity through the nozzle assembly and for maintaining the liquid, such as contact lens saline solution, in sterile condition during storage and repeated dispensing of the liquid from the container cavity, said nozzle assembly comprising:
   a discharge port;
   liquid conduit means for flow communication from the container cavity to said discharge port to enable dispensing of said liquid therethrough during said squeezed liquid dispensing;
   a base member supporting said nozzle assembly and securable to a liquid delivery portion of said container; and
   a seal element in sealing engagement against said base member for sealing said liquid conduit means against liquid leakage therefrom, wherein said seal element has a composition comprising polytetrafluoroethylene, wherein said seal element and a valve portion are integrally joined in a diaphragm structure arranged to control liquid flow through said liquid conduit means, and wherein said seal element includes at least one aperture through which a coupling portion of said valve portion projects for mechanical interlock therebetween.

14. A nozzle assembly according to claim 13, wherein said seal element comprises a peripheral portion of said diaphragm structure surrounding a valve portion of said diaphragm structure which is deflectable to permit said liquid flow through said liquid conduit means.

15. A nozzle assembly according to claim 14, wherein said seal element comprises an annular portion circumscribing said valve portion.

* * * * *

UNITED STATES PATENT AND TRADEMARK OFFICE
CERTIFICATE OF CORRECTION

PATENT NO. : 5,431,310
DATED : July 11, 1995
INVENTOR(S) : Rowland W. Kanner and Geoffrey M. Novelli It is certified that error appears in the above-indentified patent and that said Letters Patent is hereby corrected as shown below:

On the title page, item

75 Inventors: "Geoffrey M. Nevelli" should be
--Geoffrey M. Novelli --

Column 5, Line 32 "disperser" should be -- dispenser --

Column 6, Line 30 "disperser" should be -- dispenser --

Signed and Sealed this

Twelfth Day of December, 1995

Attest:

BRUCE LEHMAN

Attesting Officer

Commissioner of Patents and Trademarks